3,839,348
5-NITRO-2,2'-THIOBISTHIAZOLE COMPOUNDS
Edward F. Elslager and Donald F. Worth, Ann Arbor, Mich., assignors to Parke, Davis & Company, Detroit, Mich.
No Drawing. Filed Feb. 20, 1973, Ser. No. 333,624
Int. Cl. C07d 91/38
U.S. Cl. 260—302 F                                     6 Claims

ABSTRACT OF THE DISCLOSURE 5-nitro-2,2'-thiobisthiazole compounds represented by the formula

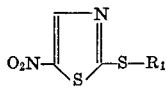

where $R_1$ represents 2-thiazolyl, 4-methyl-2-thiazolyl, 4-ethyl-2-thiazolyl, 4,5-dimethyl-1-thiazolyl, or 4,5,6,7-tetrahydro-2-benzothiazolyl; and their production by reacting 2-bromo-5-nitrothiazol with an appropriate thiazolyl mercaptan compound or an alkali metal salt thereof. The compounds are useful as chemotherapeutic agents having antifungal and antibacterial activity.

SUMMARY AND DETAILED DESCRIPTION

The present invention relates to new thiazole compounds that are useful as chemotherapeutic agents and to methods for their production. More particularly, the invention relates to new 5-nitro-1,2'-thiobisthiazole compounds that are represented by the formula

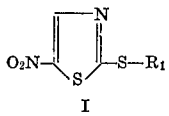
I where $R_1$ represents 2-thiazolyl, 4-methyl-2-thiazolyl, 4-ethyl-2-thiazolyl, 4,5-dimethyl-2-thiazolyl, or 4,5,6,7-tetrahydro-2-benzothiazolyl.

In accord with the invention, compounds having formula I above are produced by reacting 2-bromo-5-nitrothiazole, which has the formula,

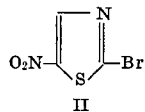
II with a mercaptan compound having the formula $$R_1\text{—SH}$$
III or an alkali metal salt thereof, where $R_1$ has the same meaning as given above. The reaction is best carried out in a non-reactive solvent medium. Suitable solvents include lower alkanols and lower aliphatic ketones. Preferred solvents are methanol and acetone. When it is desired to use an alkali metal salt of the mercaptan compound of formula III as one of the reactants, the salt is formed by adding a base, such as an alkali metal alkoxide, to the reaction mixture. Sodium methoxide is a preferred base for this purpose. The base also serves to neutralize the reaction product mixture. The temperature and duration of the reaction are not critical and may be varied, the temperature over the range from 10 to 75° C. and the duration from 10–15 minutes to 18–20 hours. It is most convenient to carry out the reaction at room temperature and at that temperature it is usually complete after 4–6 hours. Equivalent quantities of the reactants are normally employed although a small excess of either is not harmful. A large excess of base should be avoided.

The compounds of the invention are new chemical compounds that are useful as chemotherapeutic agents having antifungal and antibacterial activity. As antifungal agents, they are effective against pathogenic and non-pathogenic yeasts such as *Candida albicans* and human and animal filamentous fungal pathogens such as *Trichophyton mentagrophytes*. The antifungal activity of the compounds of the invention can be demonstrated and quantitatively determined in a test procedure carried out as follows.

A test compound is serially diluted in pure N,N-dimethylformamide to give concentrations of 20,000, 4000, 800, 160, and 32 micrograms (μg.)/ml. A further dilution of 1:100 is next made from each of these into duplicate tubes containing 9.4 ml. of Bacto-Sabouraud Dextrose Broth, resulting in two sets of broth tubes having final concentrations of 200, 40, 8, 1.6, and 0.32 μg./ml. of test compound in each set. One set of broth tubes is then inoculated with 0.5 ml. of a stock suspension of *Candida albicans*, containing from $2.0 \times 10^7$ to $6.0 \times 10^7$ viable units/ml. and the other set with 0.5 ml. of a stock solution of *Trichophyton mentagrophytes*, containing from $4 \times 10^5$ to $4 \times 10^7$ viable units/ml. Following inoculation, all of the tubes are incubated for 24 hours at 28° C. These tubes are used to determine the so-called "static" test results, that is, the concentration level at which the test compound inhibits growth of the organism. After the 24-hour incubation, two serial dilutions of 1:100 into Bacto-Sabouraud Dextrose Broth are made from each of these tubes into a new set of tubes, which are used to determine the so-called "cidal" test results, that is, to determine at which of the original concentration levels the test compound effectively kills all of the organisms. All of the tubes, both "static" and "cidal," are incubated at 28° C. for 5–6 days following inoculation. The "static" tubes are then read subjectively for evidence of growth or no growth, and the "cidal" tubes are read for killed organisms.

The results obtained in the foregoing test method for the compounds of the invention are summarized in the following table, where the compounds are identified by reference to the examples that follow and the activity of each is expressed in terms of the minimum inhibitory concentration ("MIC") against the test organisms.

ANTIFUNGAL ACTIVITY

| | MIC, μg./ml., against— | | | |
|---|---|---|---|---|
| | Candida albicans | | Trichophyton mentagrophytes | |
| Compound | Static | Cidal | Static | Cidal |
| Example: | | | | |
| 1 | 40 | 40 | 1.6 | 1.6 |
| 2(a) | 8 | 40 | 1.6 | 1.6 |
| 2(b) | 8 | 40 | 1.6 | 1.6 |
| 3 | 8 | 40 | 1.6 | 40 |
| 4 | 8 | | <0.3 | |

As antibacterial agents, the compounds of the invention are active *in vitro* against *Myco. tuberculosis*.

The compounds of the invention are preferably administered topically, although oral or parenteral administration can also be used for certain purposes. They can be combined with either a solid or liquid carrier or diluent and made available in varying amounts in such pharmaceutical forms as ointments, creams, aerosol sprays, tablets, capsules, powders, and aqueous and non-aqueous suspensions and solutions.

The invention is illustrated by the following examples.

EXAMPLE 1

To a slurry of 35.1 g. of 2-mercaptothiazole in 1.5 liters of methanol is added 16.2 g. of sodium methoxide, and the resulting mixture is filtered. To the filtrate is added 62.8 g. of 2-bromo-5-nitrothiazole, and the reaction mixture is stirred at room temperature for 30 minutes. Upon chilling, there is obtained from the mixture a solid precipitate of 5-nitro-2,2′-thiobisthiazole, which is isolated and purified by crystallization from acetonitrile; m.p. 122–124° C.

EXAMPLE 2

(a) A solution of 1.30 g. of 2-mercapto-4-methylthiazole in warm methanol is treated with activated charcoal and filtered. To the filtrate is added 0.54 g. of sodium methoxide and 2.09 g. of 2-bromo-5-nitrothiazole, and the resulting mixture is stirred at room temperature for 4 hours. The solid precipitate of 4-methyl-5′-nitro-2,2′-thiobisthiazole that is obtained is isolated and purified by crystallization from methanol; m.p. 87–89° C.

(b) Utilizing the procedure described in (a) above, with the substitution of 4-ethyl-2-mercaptothiazole for the 2-mercapto-4-methylthiazole, there is obtained 4-ethyl-5′-nitro-2,2′-thiobisthiazole; m.p. 73–75° C., following crystallization from methanol.

EXAMPLE 3

A mixture consisting of 2.09 g. of 2-bromo - 5 - nitrothiazole, 1.45 g. of 4,5-dimethyl-2-mercaptothiazole, and 50 ml. of acetone is stirred at room temperature for 4 hours, and the resulting solid precipitate is isolated. It is 4,5-dimethyl-5′-nitro-2,2′-thiobisthiazole; m.p. 109–112° C., following crystallization from methanol.

EXAMPLE 4

A mixture of 0.58 g. of 2-mercapto-4,5,6,7-tetrahydrobenzothiazole and 0.18 g. of sodium methoxide in warm methanol is stirred for 5–10 minutes and filtered. To the filtrate is added 0.71 g. of 2-bromo-5-nitrothiazole, and the resulting mixture is stirred at room temperature for 18 hours. The solid precipitate of 4,5,6,7-tetrahydro-2-[(5-nitro-2-thiazolyl)thio]benzothiazole that is obtained is isolated and purified by crystallization from acetonitrile; m.p. 108–110° C.

What is claimed is:

1. 5-nitro-2,2′-thiobisthiazole compounds that are represented by the formula

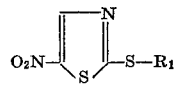

where $R_1$ represents a member of the class consisting of 2-thiazolyl, 4-methyl-2-thiazolyl, 4-ethyl-2-thiazolyl, 4,5-dimethyl-2-thiazolyl, and 4,5,6,7-tetrahydro - 2 - benzothiazolyl.

2. A compound according to Claim 1 which is 5-nitro-2,2′-thiobisthiazole.

3. A compound according to Claim 1 which is 4-methyl-5′-nitro-2,2′-thiobisthiazole.

4. A compound according to Claim 1 which is 4-ethyl-5′-nitro-2,2′-thiobisthiazole.

5. A compound according to Claim 1 which is 4,5-dimethyl-5′-nitro-2,2′-thiobisthiazole.

6. A compound according to Claim 1 which is 4,5,6,7-tetrahydro-2-[(5-nitro-2-thiazolyl)thio]benzothiazole.

References Cited

Elderfield (ed.): Heterocyclic Compounds, vol. 5, New York, John Wiley & Sons, pp. 565–6 (1957).

Todesco et al.: Chem. Abstracts, 75:48198w (1971).

RICHARD J. GALLAGHER, Primary Examiner

U.S. Cl. X.R.

260—302 H, 302 S, 302 R; 424—270